United States Patent
Crocker et al.

(10) Patent No.: US 7,171,226 B2
(45) Date of Patent: Jan. 30, 2007

(54) COMMUNICATION RETRY METHOD OVER DIGITAL WIRELESS SYSTEMS

(75) Inventors: Dwayne A. Crocker, Oxford, MI (US); Ronald W. Fraser, Lake Orion, MI (US)

(73) Assignee: General Motors Corporation, Detroit, MI (US)

(*) Notice: Subject to any disclaimer, the term of this patent is extended or adjusted under 35 U.S.C. 154(b) by 304 days.

(21) Appl. No.: 10/299,920

(22) Filed: Nov. 19, 2002

(65) Prior Publication Data

US 2004/0198366 A1    Oct. 7, 2004

(51) Int. Cl.
*H04Q 7/20* (2006.01)

(52) U.S. Cl. .......... 455/510; 455/404.1; 455/434; 455/452.2; 455/455

(58) Field of Classification Search ........ 455/510, 455/502, 435, 434, 414.1, 435.1, 435.2, 95, 455/452.1, 455, 404.1, 404.2, 452.2, 450, 455/451; 370/324, 331, 350, 335, 428, 469
See application file for complete search history.

(56) References Cited

U.S. PATENT DOCUMENTS

| | | | | |
|---|---|---|---|---|
| 4,811,380 A | * | 3/1989 | Spear | 455/437 |
| 5,280,541 A | * | 1/1994 | Marko et al. | 455/462 |
| 5,488,640 A | * | 1/1996 | Redden et al. | 375/357 |
| 5,544,224 A | * | 8/1996 | Jonsson et al. | 455/434 |
| 5,590,177 A | * | 12/1996 | Vilmur et al. | 455/436 |
| 5,687,215 A | * | 11/1997 | Timm et al. | 455/404.2 |
| 5,937,355 A | * | 8/1999 | Joong et al. | 455/466 |
| 5,987,334 A | * | 11/1999 | Kaku | 455/552.1 |
| 5,995,830 A | * | 11/1999 | Amin et al. | 455/423 |
| 6,091,962 A | * | 7/2000 | Bonta | 455/502 |
| 6,167,031 A | * | 12/2000 | Olofsson et al. | 370/252 |
| 6,215,782 B1 | * | 4/2001 | Buskens et al. | 370/350 |
| 6,240,285 B1 | * | 5/2001 | Blum et al. | 455/404.1 |
| 6,246,872 B1 | * | 6/2001 | Lee et al. | 455/414.1 |
| 6,282,419 B1 | * | 8/2001 | Findikli | 455/434 |
| 6,343,216 B1 | * | 1/2002 | Kim et al. | 455/450 |
| 6,493,629 B1 | * | 12/2002 | Van Bosch | 701/207 |
| 6,501,947 B1 | * | 12/2002 | Hunzinger et al. | 455/414.1 |
| 6,597,908 B1 | * | 7/2003 | Yu | 455/424 |
| 6,600,914 B2 | * | 7/2003 | Uhlik et al. | 455/404.1 |
| 6,785,249 B2 | * | 8/2004 | Soliman | 370/335 |
| 6,990,349 B1 | * | 1/2006 | Idrissi | 455/450 |
| 2002/0077075 A1 | * | 6/2002 | Ikonen et al. | 455/404 |
| 2003/0087642 A1 | * | 5/2003 | Mazzara | 455/450 |

FOREIGN PATENT DOCUMENTS

EP    0 526 240 A2  *  7/1992

* cited by examiner

*Primary Examiner*—Charles N. Appiah
(74) *Attorney, Agent, or Firm*—Anthony Luke Simons

(57) ABSTRACT

The invention provides a method of reestablishing wireless communications for a mobile vehicle. After a communication link failure on a first communication link is detected, it is determined whether to reconnect on the first communication link based on at least one communication condition factor, and then an attempt is made to establish a second communication link based on the communication condition factor determination.

21 Claims, 3 Drawing Sheets

COMMUNICATION RETRY METHOD OVER DIGITAL WIRELESS SYSTEMS

FIELD OF THE INVENTION

This invention relates generally to operating a wireless communication system. More specifically, the invention relates to a method of reestablishing a failed communication link for a mobile vehicle, and to establishing communications over an alternative link.

BACKGROUND OF THE INVENTION

In typical telematics applications, a telematics unit in an automobile or truck uses one primary communication link between itself and a designated telematics service center to relay voice and data content. Most often voice and data are transmitted over the same communication link, either periodically with separate data and voice sessions over the same communication link, or concurrently with voice and data transmitted at the same time but on different channels.

Voice and data are transmitted using a preferred type of communication link. While digital cellular transmissions are becoming the preferred communication link for many types of communications, there needs to be alternatives when the primary or preferred connection fails or is unavailable. With the advent of digital cellular communications, multiple communication links become inherently available to an in-vehicle communications device. The voice and data communications are transmitted by several different communication link types including analog cellular calls, digital cellular calls, short message service transmissions, and transmissions over a digital Internet protocol (IP) link.

The first information that is conveyed after the establishment of a communication link between a mobile vehicle and telematics service center may be critical with information such as the identification of the telematics unit, location of the mobile vehicle, and event type. For example, when an airbag is deployed, the telematics unit might send out a short message to a call center conveying information on the identification and location of the vehicle with the deployed airbag. If the communication link to the telematics service center fails before essential data is sent, the call center may not be able to take appropriate action and deliver necessary services.

The example just given demonstrates the need for a backup strategy to provide alternative communication links when the first link fails. A method for reestablishing wireless communications would benefit from a strategy that determines the type of communication link failure and evaluates factors that could affect the success of the same or another link type before the voice or data communications are reestablished. The result may be more reliable communications between the mobile vehicle and the telematics service center, particularly during critical events such as times of vehicle inoperability and driver discomfort. The end result would be higher confidence that critical data will be received by the telematics service center, increased subscriber satisfaction, and improvement of telematics services.

Therefore, the intent of this invention is to provide an improved method for reestablishing communication links between a mobile vehicle and telematics service center. The approach would evaluate information on the communication link failure and other condition factors to determine which type of communication link should be attempted next, overcoming the deficiencies and obstacles described above.

SUMMARY OF THE INVENTION

One aspect of the invention provides a method of and system for reestablishing wireless communications for a mobile vehicle. A communication link failure on a first communication link is detected. Whether to reconnect on the first communication link is determined based on one or more communication condition factors. An attempt is made to establish a second communication link based on the communication condition factor determination. Another aspect of the invention provides a computer useable medium including a computer program to reestablish wireless communications for a mobile vehicle.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
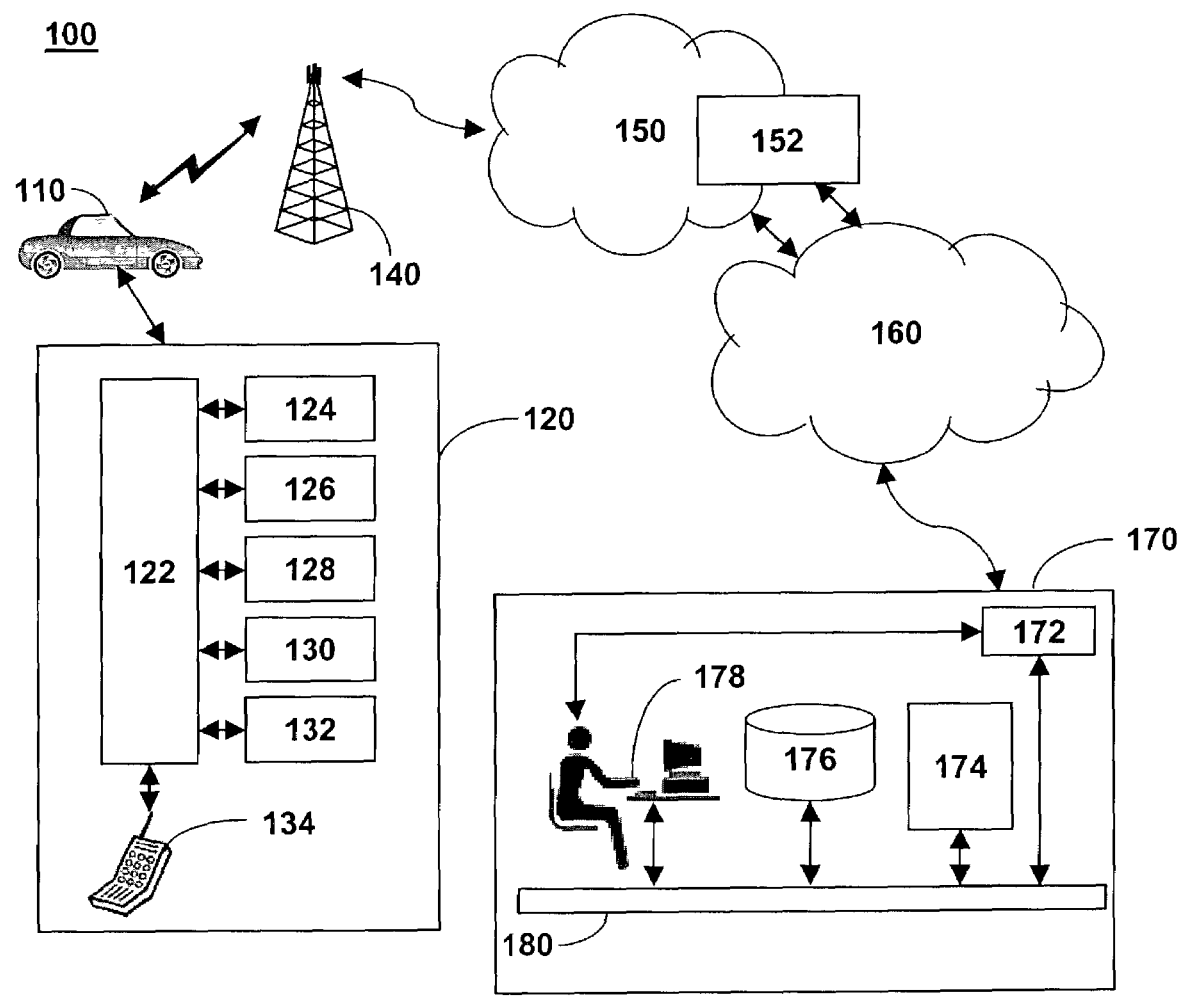
FIG. 1 is an illustration of one embodiment of a system for reestablishing wireless communications for a mobile vehicle, in accordance with the current invention.

FIG. 1 shows an illustration of one embodiment of a system for reestablishing wireless communications for a mobile vehicle, in accordance with the present invention at 100. Wireless communication reestablishment system 100 typically includes a mobile vehicle 110, a telematics unit 120, one or more wireless carrier systems 140, one or more communication networks 150, one or more land networks 160, and one or more call centers 170.

Mobile vehicle 110 is a mobile vehicle equipped with suitable hardware and software for transmitting and receiving voice and data communications. Mobile vehicle 110 contains telematics unit 120 that may include a vehicle communications processor. An exemplary telematics unit 120 includes digital signal processor (DSP) 122 connected to a wireless analog, digital or dual-mode modem 124, a global positioning system (GPS) unit 126, an in-vehicle memory 128, a microphone 130, one or more speakers 132, and a network access device (NAD) or in-vehicle mobile phone 134. In-vehicle mobile phone 134 can be an analog, digital, or dual-mode cellular phone. GPS unit 126 provides, for example, longitude and latitude coordinates of the vehicle. DSP 122 can be alternatively referred to as a controller, a microcontroller, a processor, a microprocessor, or a central processing unit.

DSP 122 contains various computer programs that control programming and operational modes of various applications within mobile vehicle 110. A voice-recognition application may be installed in DSP 122 that translates human voice input through microphone 130 to digital signals. These signals activate the programming mode and operation modes, as well as provide input data. Output signals from DSP 122 may be transformed into digitized voice messages that are sent out through speaker 132.

Mobile vehicle 110 via telematics unit 120 send and receive radio transmissions from wireless carrier system 140. Wireless carrier system 140 is any suitable system for transmitting a signal from mobile vehicle 110 to communication network 150.

Wireless carrier system 140 is typically a wireless communications carrier. Wireless carrier system 140 is, for example, a mobile telephone system. The mobile telephone system may be an analog mobile telephone system operating over a prescribed band nominally at 800 MHz. Alternatively, the mobile telephone system may be a digital mobile telephone system operating over a prescribed band nominally at 800 MHz, 900 MHz, 1900 MHz, or any suitable band capable of carrying mobile communications.

Communication network 150 comprises services from one or more mobile telephone switching offices and wireless networks. Communication network 150 connects wireless carrier system 140 to land network 160. Communication network 150 is any suitable system or collection of systems for connecting wireless carrier system 140 to mobile vehicle 110 and land network 160.

Communication network 150 typically includes one or more short message service centers (SMSC) 152, which may send and receive short messages according to established protocols such as IS-637 standards for short message service (SMS), IS-136 air interface standards for SMS, and GSM 03.40 and 09.02 standards. Similar to paging, an SMS communication may be posted along with an intended recipient, such as a communication device in mobile vehicle 110. SMSC 152 may be software that resides in communication network 150 and manages the processes including queuing the messages, billing the sender, and returning receipts if necessary.

Land network 160 is typically a public-switched telephone network. It also could be an Internet protocol (IP) network. Land network 160 may be comprised of a wired network, an optical network, a fiber network, another wireless network, or any combination thereof. Land network 160 is connected to one or more land-line telephones 165. Land network 160 usually connects communication network 150 to call center 170. Communication network 150 and land network 160 may connect wireless carrier system 140 to a communication node or call center 170.

Call center 170 is a telematics service center. An exemplary call center 170 contains one or more voice and data switches 172, one or more communication services managers 174, one or more communication services databases 176, one or more communication services advisors 178, and one or more bus systems 180.

Call center 170 is a location where many calls may be received and serviced at the same time, or where many calls may be sent at the same time. The call center may be a telematics call center, facilitating communications to and from telematics unit 120 in mobile vehicle 110. The call center often is a voice call center, providing verbal communications between an advisor in the call center and a subscriber in a mobile vehicle. Additionally, the call center may be a short message service (SMS) management center, which may send SMS communications to mobile vehicle 110 and receive SMS communications back from mobile vehicle 110 via SMSC 152 of communication network 150. The call center may contain each of these functions.

Call center 170 typically contains one or more voice and data switches 172. Switch 172 is connected to land network 160. Switch 172 transmits voice or data transmissions from call center 170. Switch 172 also may receive voice or data transmissions from telematics unit 120 in mobile vehicle 110 through wireless carrier system 140, communication network 150 and land network 160. Switch 172 receives from or send to one or more communication services managers 174 data transmissions via one or more bus systems 180. Communication services manager 174 is any suitable hardware and software capable of providing requested communication services to telematics unit 120 in mobile vehicle 110. Exemplary communication services manager 174 sends to or receive from one or more communication services databases 176 data transmissions via bus system 180. It sends to or receives from one or more communication services advisors 178 data transmissions via bus system 180. Communication services database 176 also sends to or receives from communication services advisor 178 data transmissions via bus system 180. Communication services advisor 178 receives from or send to switch 172 voice or data transmissions.

Communication services manager 174 provides one or more of a variety of services, including enrollment services, navigation assistance, directory assistance, roadside assistance, business or residential assistance, information services assistance, emergency assistance, communications assistance and activation services for replenishing personal call minutes. Communication services manager 174 typically transmits data to telematics unit 120 in mobile vehicle 110 through wireless carrier system 140, communication network 150, land network 160, voice and data switch 172, and bus system 180. Communication services manager 174 may store or retrieve data and information from communication services database 176. It may also provide requested information to communication services advisor 178.

Communication services advisor 178 can be a real human advisor or a virtual advisor. A real advisor is a human being in verbal communication with a user or subscriber in mobile vehicle 110 via telematics unit 120. A virtual advisor is a synthesized voice interface responding to requests from telematics unit 120 in mobile vehicle 110.

An exemplary communication services advisor 178 provides services to telematics unit 120 in mobile vehicle 110. Services provided by communication services advisor 178 include, but are not limited to, enrollment services, navigation assistance, directory assistance, roadside assistance, business or residential assistance, information services assistance, emergency assistance, and communications assistance. Communication services advisor 178 typically communicates with telematics unit 120 in mobile vehicle 110 through wireless carrier system 140, communication network 150, and land network 160 using voice transmissions, or through communication services manager 174 and switch 172 using data transmissions. Switch 172 can select between voice transmissions and data transmissions.

Figure 2:
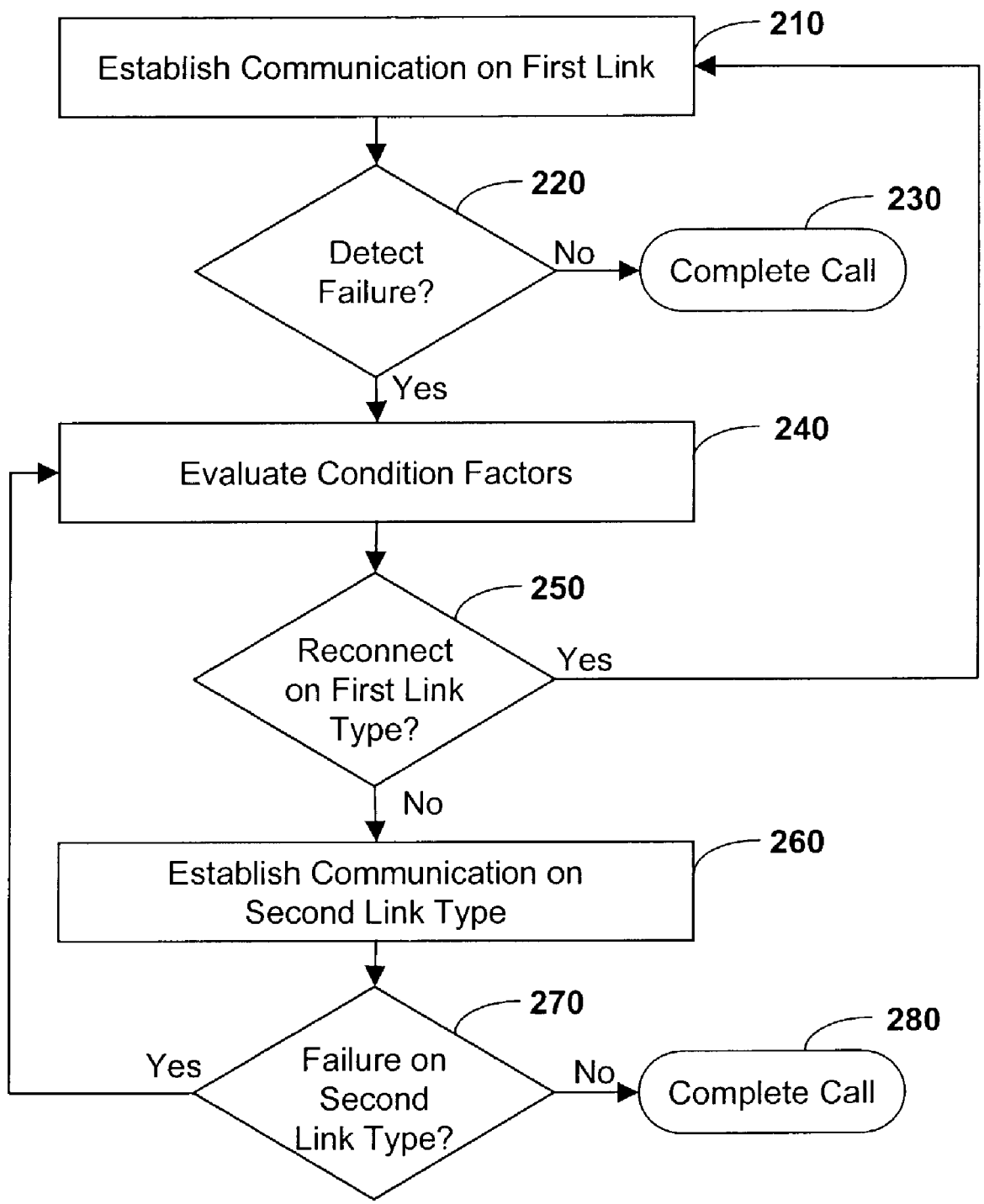
FIG. 2 is a flow diagram of one embodiment of a method for reestablishing wireless communications for a mobile vehicle, in accordance with the current invention.

FIG. 2 shows a flow diagram of one embodiment of a method for reestablishing wireless communications from a mobile vehicle to a call center or telematics service center. Wireless communication reestablishment method 200 is usually used when a primary communication link fails and another link needs to be established, or when a primary communication link cannot be established. As analog-based systems migrate towards digital wireless (cellular) systems, additional communication links become available to the in-vehicle communication device inside the telematics unit. The present invention emphasizes a method for determining whether to try to reconnect a failed phone call on the same analog or digital link, or to attempt communications over an alternative communication link type.

As seen at block 210, a telematics unit of a mobile vehicle attempts to establish communications with a telematics service center. The attempt is triggered by an event such a global positioning system update request, a signal of an airbag deployment, or a user request for enrollment services, navigation assistance, directory assistance, roadside assistance, business or residential assistance, information services assistance, emergency assistance, or communications assistance.

Typically, an in-vehicle telematics device has a predetermined primary communication link type, such as a digital cellular call or an analog cellular call, to relay voice and data content between the telematics unit and a designated telematics service center. The voice and data transmissions may be through the same communication link, either sequentially (i.e., separate data and voice sessions over the same communication link) or concurrently (i.e., voice and data transmitted together instantaneously). Other possible communication link types include analog cellular calls, short message service communications, data transmissions over Internet protocol, and voice transmissions over Internet protocol. If the mobile device is equipped with local area network (LAN) or personal area network (PAN) capabilities, the communication link type can include a wireless LAN/PAN Internet protocol link.

The predetermined communication link may or may not fail, as seen at block 220. If it does not fail, the transmission of voice or data continues until the call is completed, as seen at block 230. If the communication link does fail, the call attempt may be abandoned or postponed when the call, for example, contains time-insensitive information or contains no time-critical information. In most situations, the retry strategy of the present invention is used to establish a wireless communication link. Immediately after the establishment of the communication link, the telematics unit may provide critical information to the call center. Examples of critical information include telematics unit identification, vehicle position, and type of event initiating the communication such as a personal call request, an airbag deployment, or a navigational assistance request. This information is used by the call center to determine priority of the session, and inform the advisor so that proper action can be taken.

When a communication link fails before ever connecting to a call center or a connection that was established fails, information on the link failure type and the communication condition factors can be collected and evaluated by a software application in the telematics unit, as seen at block 240.

There are a number of factors that may influence the choice of communication link including the type of failure, the velocity of the mobile vehicle, the bit or frame-error rates of the voice or data channel, the location of the mobile vehicle, a criticality assessment of the information to be communicated, an assessment of the type of data to be communicated, the basis for the call, a delay impact assessment, a reconnect attempt elapsed time, a reconnect attempt number, and the availability of digital or analog coverage. One factor is whether there is digital or analog cellular coverage for the current location of the vehicle, which the telematics unit may detect. The location of the vehicle, such as in an urban area surrounded by large and tall buildings or mountainous terrain, also can be a factor influencing the choice of communication link. Geophysical data is available from the GPS unit in coordination with a geophysical database. Communication condition factors include, but are not limited to, the number of call attempts, or the elapsed time for establishing connections. A reconnect attempt time period may be provided for establishing the second communication link. A reconnect attempt number limit may be provided for establishing the second communication link.

Another factor, the link failure type, typically includes a bit-error rate failure, a frame-error rate failure, a critical data transmission failure, an interim data transmission failure, or a voice transmission failure. The type of failure includes information on whether the data was critical, which may require a prompt action or response, or was interim data, which may be vehicle or system data updates that do not require immediate responses. The telematics unit can factor in the velocity of the vehicle because higher speeds increase the bit or frame-error rates of the communication link when, for example, the in-vehicle telematics unit is moving more than 40 miles per hour, as detected by the GPS device in the telematics unit. Bit or frame-error rates of the voice or data communication link are similarly influential and their detection may help determine if the existing or current communication link should be retried prior to disconnection, or if the device should immediately transition to another communication link. If a bit-error rate or a frame-error rate is above a predetermined threshold, then a different type of communication link may be selected. If a bit-error rate or a frame-error rate is less than a predetermined threshold and the call connection is lost, the algorithm may retry on the first communication link type. Another factor includes the criticality of the information to be transmitted, i.e. the importance of the data and its susceptibility to delays. Examples of critical block of data include the vehicle identification and location, or the nature of the call request. A non-critical block of data can be queued and sent out, for example, at a later time when communications are reestablished over a less costly link type. The time of the communication link failure are also considered for reestablishing wireless communications for a mobile vehicle.

After evaluating the communication condition factors, type of failure, and other pertinent information, the telematics unit determines whether or not to try to reconnect communications on the first communication link type, as seen at block 250. If the answer is yes, the telematics unit attempts to reestablish communications on a second communication link that is the same type of link as the first communication link, as seen back at block 210.

When the telematics unit determines not to reconnect on the same communication link type, it attempts to establish communications on another type of communication link type, as seen at block 260. This type may include an analog cellular call, a digital cellular call, a SMS transmission, a data transmission over the Internet, or a voice transmission over the Internet.

The attempt to establish communications on the second link type may or may not be successful, as seen at block 270. When there is no failure on the second link type, communications between the telematics unit and the telematics service center can continue until the call is completed, as seen at block 280.

When communications on the second link also fails, the telematics may again evaluate the condition factors surrounding the failure and determine which communication link to try, as seen back at blocks 240, 250 and 260.

Figure 3:
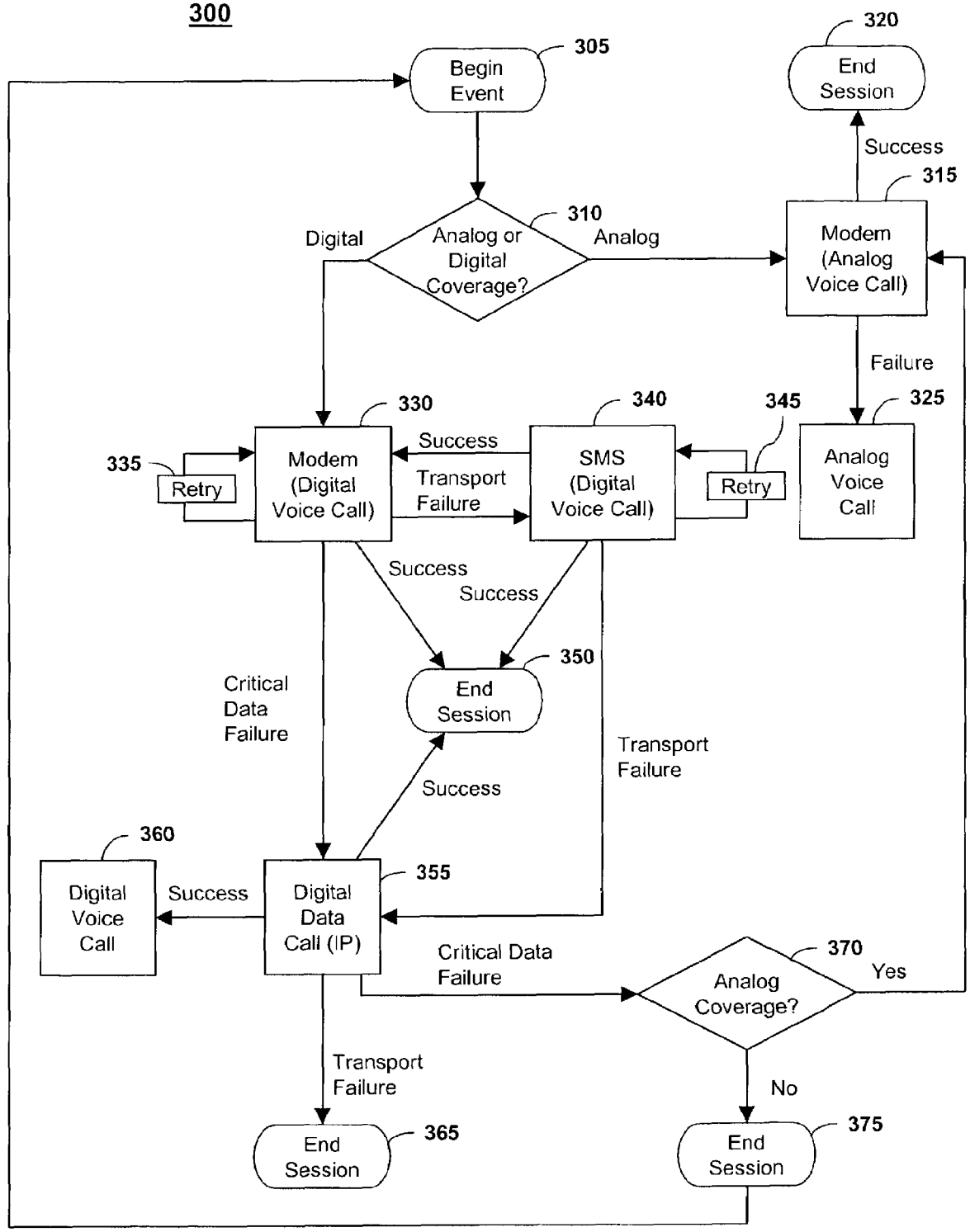
FIG. 3 is a flow diagram of another embodiment of a method for reestablishing wireless communications for a mobile vehicle, in accordance with the current invention.

FIG. 3 shows a flow diagram of another embodiment of a method for reestablishing wireless communications for a mobile vehicle. Wireless communication reestablishment method 300 illustrates the possible transitions that may occur when a primary communication link fails and another link needs to be established.

An attempt to establish a communication link is made, as seen at block 305. The telematics unit can determine whether there is analog or digital wireless coverage for the current location of the mobile vehicle, as seen at block 310. A connection attempt is made based on the coverage determination. If the connection attempt fails, a retry is made. A telematics unit may be programmed to retry the same communication link three or four times before determining to try another communication link.

When an analog connection is attempted, communications are routed through an analog modem, as seen at block 315. When data is sent successfully through the analog modem of the telematics unit to a designated telematics service center, the transmission is completed and the communication session continues with data and voice segments until completed, as seen at block 320. When data is not sent successfully through the analog modem, the telematics may revert to placing an analog voice call to the call center with the in-vehicle mobile phone unit, as seen at block 325. The analog voice is placed, for example, using a cleared number that does not require authentication. A data call may also be placed using a cleared number.

When a digital connection is attempted, communications are routed through a digital modem, as seen at block 330. If the telematics unit is unsuccessful in establishing the digital link, it may try again to establish a communication link by using a digital cellular call, as seen at block 335, or transition to the next state, based on one or more condition factors and possibly the link failure type. Some reasons for unsuccessful transmission include failure of hardware such as a malfunctioning modem, a malfunctioning buffer, a high or low radio-frequency signal condition, a high frame-error rate, a high bit-error rate, or radio frequency channel problems. A setting of the wireless system may be adjusted based on the communication link failure, and a communication link may be established with the adjusted wireless communication system setting. A wireless system setting is, for example, a preferred wireless carrier type.

When the hardware is functioning correctly and the communication link is established, the data is transmitted successfully and the communication session may end, as seen at block 350.

Data is routed through several additional types of digital communication links, including short messaging service (SMS), digital data over the Internet, and digital voice call. The telematics unit may determine which communication link is the best choice for a certain type of communication and for establishing a communication link with the call center.

In this exemplary embodiment of the present invention, the telematics unit determines to use a short messaging service, as seen at block 340. SMS is used to receive short message service updates to the software in the telematics unit and to send information such as the location of the vehicle from its GPS device. GSM, TDMA and CDMA-based mobile phone networks support SMS messages. Short messages are sent and received simultaneously with voice, data and fax calls because they can travel over the same dedicated voice transmission channel or they can travel over an alternative transmission channel using the same signaling path. As such, SMS rarely gets a busy or engaged signal, as do other communication links during peak network usage times.

When the telematics unit is unsuccessful in establishing the SMS link, it considers various conditions or factors, such as the high velocity of the vehicle, that influence the successful transmission of data and determine whether SMS remains the best option for transmission. The telematics unit may try again to establish a communication link using SMS, as seen at block 345. When it is successful and the data has been transmitted completely by SMS, the telematics unit ends the session, as seen at block 350. After a successful SMS transfer, the communication may require additional transmissions over another type of communication link, at which time the telematics unit continues transmitting data through the data modem by a digital cellular call, as seen back at block 330. If the SMS link has failed due to transport failure, for example, the telematics unit determines to try sending its digital data via an Internet protocol (IP), as seen at block 355.

Another communication link originating at the telematics unit using a digital data call is a digital Internet link with data sent using Internet protocol (IP), as seen at block 355. When this communication link is established successfully, the telematics unit determines that data should be sent over the Internet, and when it is sent, the communication session ends, as seen at block 350, or establishes a voice call, as seen at block 360. When the communication link is successfully established with a digital voice call, the data also may be sent over the digital voice call.

When a communication link has not been established successfully over the Internet due to a transport failure, the telematics may determine that the information to be sent is not critical data, and that the communication session may end, as seen at block 365, with the data to be sent at a later time. An example of this is when the telematics unit is scheduled to send update information from the telematics unit to the call center at a predetermined time, but a delay of relaying the update would have little or no impact to the customer or service.

When the telematics unit determines that important and time-sensitive data needs to be sent, it can check on the availability of analog cellular coverage for the current location of the mobile vehicle, as seen at block 370. When analog coverage is unavailable, the telematics unit discontinues the communication session seen at block 375, and begins again the process of establishing a communication link, as seen back at block 305. When analog coverage is available, the telematics unit attempts to establish a communication link through the analog modem, as seen back at block 315.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for reestablishing wireless communications from a mobile vehicle to a call center, the method comprising:

receiving a trigger;

initiating a first communication attempt over a first communication link with a call center based on the trigger;

detecting a communication link failure;

determining at least one communication condition factor based on the failure;

determining at least one link failure type based on the failure;

determining whether to reconnect with the call center over the first communication link or a second communication link based on the at least one communication condition factor and at least one link failure type; and initiating a second communication attempt over either the first communication link or second communication link based on the determination.

2. The method of claim 1 wherein the at least one communication condition factor is selected from a group consisting of a criticality assessment of information to be communicated, an assessment of a type of data communicated, a call basis, a delay impact assessment, a reconnect attempt elapsed time, velocity of the vehicle, location of the vehicle based an a GPS determination and a geophysical database, and a reconnect attempt elapsed number.

3. The method of claim 1 wherein the at least one communication condition factor is selected from a group consisting of an availability of digital coverage and an availability of analog coverage.

4. The method of claim 1 wherein the lint failure type is a bit-error rate failure.

5. The method of claim 1 wherein the trigger is responsive to an event selected from the group consisting of a global positioning system update request, airbag deployment, and emergency assistance.

6. The method of claim 1 wherein the trigger is responsive to an event selected from The group consisting of a user request for enrollment services, navigation assistance, directory assistance, business or residential assistance and communications assistance.

7. The method of claim 1 wherein the link failure type is a frame-error rate failure.

8. The method of claim 1 wherein the link failure type is a critical data transmission failure.

9. The method of claim 1 wherein die link failure type is an interim data transmission failure.

10. The method of claim 1 wherein the link failure type is a voice transmission failure.

11. A computer-readable medium having a computer program stored thereon to reestablish wireless communications for a mobile vehicle, the computer program comprising:
    computer readable code for receiving a trigger;
    computer readable code for initiating a first communication attempt over a first communication link with a call center based on the trigger;
    computer readable code for detecting a communication link failure;
    computer readable code for determining at least one communication condition factor based on the failure;
    computer readable code for determining at least one link failure type based on the failure;
    computer readable code for determining whether to reconnect with the call center over the first communication link or a second communication link based on the at least one communication condition factor and at least one link failure type; and
    computer readable code for initiating a second communication attempt over either the first communication link or second communication link based on the determination.

12. The medium of claim 11 wherein the at least one communication condition factor is selected from a group consisting of a criticality assessment of information to be communicated, an assessment of a type of data communicated, a call basis, a delay impact assessment, a reconnect attempt elapsed time, velocity of the vehicle, location of the vehicle based on a GPS determination and a geophysical database, and a reconnect attempt elapsed number.

13. The medium of claim 11 wherein the at least one communication condition factor is selected from a group consisting of an availability of digital coverage and an availability of analog coverage.

14. The medium of claim 11 wherein the link failure type is a bit-error rate failure.

15. The medium of claim 11 wherein the trigger is responsive to an event selected from the group consisting of a global positioning system update request, airbag deployment, and emergency assistance.

16. The medium of claim 11 wherein the trigger is responsive to an event selected from the group consisting of a user request for enrollment services, navigation assistance, directory assistance, business or residential assistance and communications assistance.

17. The medium of claim 1 wherein the link failure type is a frame-error rate failure.

18. The medium of claim 11 wherein the link failure type is a critical data transmission failure.

19. The medium of claim 11 wherein the link failure type is an interim data transmission failure.

20. The medium of claim 11 wherein the link failure type is a voice transmission failure.

21. A system to reestablish wireless communications for a mobile vehicle, comprising:
    means for receiving a trigger;
    means for initiating a first communication attempt over a first communication link with a call center based on the trigger;
    means for detecting a communication link failure;
    means for determining at least one communication condition factor based on the failure;
    means for determining at least one link failure type based on the failure;
    means for determining whether to reconnect with the call center over the first communication link or a second communication link based on the at least one communication condition factor and at least one link failure type; and
    means for initiating a second communication attempt over either the first communication link or second communication link based on the determination.

* * * * *